United States Patent Office 3,324,068
Patented June 6, 1967

3,324,068
PLASTICIZED POLYELECTROLYTE GEL AND
METHOD OF MAKING SAME
Alan S. Michaels, Lexington, Mass., assignor to
Amicon Corporation, Cambridge, Mass.
No Drawing. Filed Jan. 27, 1964, Ser. No. 340,499
12 Claims. (Cl. 260—30.6)

This invention relates to a plasticized solid gel composition containing a water insoluble reaction product of two initially water soluble polyelectrolyte polymers, each having dissociable ionic groups of opposite charge and to a method of making the same.

One object of the present invention is to provide a composition of the type described which has improved plasticity characteristics and which retains its plasticity when exposed to atmospheric conditions of ion humidity.

Another object is to provide a composition of the type described having both improved plasticity and improved electroconductivity.

Still another object is to provide a novel method of making such compositions.

While the interaction of two water soluble synthetic organic linear polyelectrolytes having dissociable ionic groups of opposite charge has previously been described, the products of such reaction, which may be termed ionically cross-linked polyelectrolyte polymers, are solid gel structures which are brittle and weak when dried unless prepared under special conditions. I have now found that non-volatile water-miscible acids with ionization constants greater than $10^{-2}$ or non-volatile water-miscible organic oxysulfur or oxyphosphorus compounds or mixtures thereof when incorporated in such an ionically cross-linked gel composition act as a permanent plasticizer therefor at room temperature and also, in the case of the acids, provide electroconductivity. The ionically cross-linked polyelectrolyte solids plasticized with the oxysulfur or oxyphosphorus compounds may be exposed to an atmosphere of high relative humidity without appreciable absorption of water and without substantial bleeding of the plasticizer to the surface of the plasticized solid composition.

Among the organic linear polymers which may be interacted to produce the ionically cross-linked gel structures which are useful in the present invention are those having a sufficiently high molecular weight (preferably at least 50,000) to be solid and capable of film formation and containing a plurality of dissociable ionic groups (anionic or cationic as the case may be) chemically bonded to the polymer chain, preferably at least one such ionic group for every six repeating monomeric units in the chain, or at least one such ionic group for each average chain interval of twelve carbon atoms in polymers containing a chain of carbon atoms in the backbone of the polymer molecule. Such polymers include, as those having anionic groups, sodium polystyrene sulfonate, sodium polyvinyl toluene sulfonate, sodium polyacrylate, sodium salts of the hydrolyzed copolymers of styrene with maleic anhydride, sodium polyvinyl sulfonate, and the corresponding free acids (when sufficiently water-soluble) as well as corresponding salts of other alkali metals. Polymers containing cationic groups include polyvinyl benzyl trimethyl ammonium chloride, polyethyleneimine, polyvinyl pyridine, poly (dimethylaminoethyl methacrylate), quaternized polyethylene imine, quaternized poly (dimethylaminoethyl) methacrylate, polyvinyl methyl pyridinium chloride, and the like. The preferred polymers are those containing sulfonate groups and those containing quaternary ammonium groups. The relative proportions of the two polymers containing oppositely charged ionic groups used in making the ionically cross-linked polyelectrolyte polymers may vary over a substantial range, from 10:1 to 1:10 by weight, preferably from 4:1 to 1:4 by weight.

The relative proportions of plasticizer and of cross-linked polyelectrolyte may vary over a considerable range depending upon the properties sought in the finished product. Even as little as 1% by weight of the acids based on the weight of the polyelectrolyte has an appreciable effect on the electroconductivity characteristics, but a considerably larger proportion of the acids or of the oxysulfur or oxyphosphorus compounds, of the order of 5% to 10% by weight, is required to produce a substantial change in the physical properties such as plasticity or flexibility. As much as 100% by weight of plasticizer based on the weight of polyelectrolyte polymer or even more may be desirable in certain cases.

Among the non-volatile acids which may be employed in the present invention are sulfuric acid, phosphoric acid, methane sulfonic acid, benzene sulfonic acid, benzene phosphonic acid, etc.; among the oxysulfur and oxyphosphorus compounds, in addition to the foregoing, are dimethyl sulfone, dimethyl sulfoxide, trimethyl phosphine oxide, hexamethyl phosphoramide, and the like.

The plasticizer may be incorporated in the solid gel structure of the ionically cross-linked polymer simply by immersing the latter in the liquid plasticizer at room temperature or at elevated temperature and allowing the solid to absorb the plasticizer to the desired extent. It is also feasible to immerse the solid in an aqueous solution of plasticizer in the same manner, but in this case the water, which is also absorbed, must be subsequently evaporated. Its evaporation may be accelerated by moderate heating, but heating to very high temperatures should be avoided because of the tendency to volatilize the plasticizer itself.

In an alternative and preferred procedure the plasticizer or an aqueous solution of the plasticizer may be mixed with a homogeneous aqueous solution containing the polymers having oppositely charged ionizable groups, maintained in solution by a highly dissociated "shielding" electrolyte in the solution. Preferably, the ionically cross-linked polyelectrolyte polymer is first prepared in purified form, then dispersed or dissolved in an aqueous solution of shielding electrolyte, after which the plasticizer or aqueous solution thereof is admixed with the solution. By selecting a volatile electrolyte as the shielding electrolyte, gelation or precipitation of the mixed solution of cross-linked polyelectrolyte and plasticizer may be achieved simply by evaporating the volatile electrolyte without the necessity for a washing step to remove it, thus avoiding the possibility that some or all of the plasticizer will also be removed during the washing step.

Among the volatile highly dissociated shielding electrolytes which may be employed in the foregoing method are hydrochloric acid, hydrobromic acid, nitric acid, and trifluoroacetic acid. The shielding electrolyte should be present in the solution in an amount at least 10% by weight of the total solution and preferably in an amount from 20% to 50% by weight or more. A water-miscible organic solvent having a volatility approximately as great as that of water or even greater may also be included in the solution. Suitable solvents include acetone, dioxane, methanol, ethanol, isopropanol, tert. butyl alcohol, pyridine, morpholine, tetrahydrofuran, N-methyl pyrrolidone, and 2-methoxy ethanol. The solvent when present may be used in amounts up to 40% by weight of the total solution.

The plasticized solid gel structure so produced may be in the form of a coating or film or any desired cast shape.

The following specific examples are intended to illustrate more clearly the nature of the present invention without serving as a limitation upon its scope.

Example 1

A purified ionically cross-linked polyelectrolyte polymer (made by reacting two parts by weight of sodium polystyrene sulfonate with approximately one part of polyvinyl benzyl trimethyl ammonium chloride in aqueous medium) in solid finely divided form in the amount of 100 parts by weight was dissolved in the following solution, in which the parts are by weight.

| | |
|---|---|
| Concentrated aqueous hydrobromic acid (48% hydrogen bromide by weight) | 133 |
| 1,4-dioxane | 133 |
| Dimethyl sulfoxide | 10 |
| Distilled water | 133 |

The resulting solution was a clear light brown in color, markedly more viscous than water but of pourable consistency.

A small quantity of this solution was spread with a standard coating bar on a glass plate and heated in an air oven at 50° C. for approximately thirty minutes. The resulting dry film was a uniform clear reddish brown color. The film was flexible and retained its flexibility even at very low ambient relative humidities.

Example 2

The same procedure was followed as was described in Example 1 except that 10 parts by weight of hexamethyl phosphoramide was substituted for the dimethyl sulfoxide. The resulting film retained its flexibility for a longer time than did the product of Example 1, even when heated at a higher temperature.

Example 3

There was dissolved in the following solution, in which the parts are by weight, 100 parts of the ionically cross-linked polyelectrolyte polymer of Example 1:

| | |
|---|---|
| Concentrated hydrochloric acid (30% hydrogen chloride by weight) | 178 |
| 1,4-dioxane | 178 |
| Dimethyl sulfoxide | 10 |
| Distilled water | 44 |

A film formed from this solution in the manner described in Example 1 was similar in properties to the film of Example 1. Hexamethyl phosphoramide, when substituted for the dimethyl sulfoxide, produced a film similar to that of Example 2.

Example 4

To the solution described below there was added 100 parts by weight of the cross-linked polyelectrolyte polymer of Example 1:

| | |
|---|---|
| Concentrated hydrochloric acid (30% hydrogen chloride) | 178 |
| 1,4-dioxane | 178 |
| Glacial phosphoric acid (85%) | 10 |
| Distilled water | 44 |

A film deposited from such solution on glass in the manner described in Example 1 displayed substantially greater flexibility than similar films containing no phosphoric acid and much greater electroconductivity. When there was also added to the composition 10 parts of dimethyl sulfoxide, the resulting film displayed greatly enhanced flexibility as well as increased electroconductivity.

Example 5

There was substituted for the phosphoric acid in Example 4 an equal quantity of concentrated sulfuric acid (96%) with similar results except that even higher electroconductivity was observed.

Hexamethyl phosphoramide was substituted for dimethyl sulfoxide in Examples 4 and 5 with similar results. Mixtures of dimethyl sulfoxide with hexamethyl phosphoramide in varying proportions were also found to be useful.

Example 6

The solution of Example 3 containing dimethyl sulfoxide was used to saturate a web of porous paper (Dynel) having a gauge of 3.5 mils. After drying for approximately five minutes in air at 50° C. the impregnated sheet appeared dry but was still flexible. It was then immersed in water at room temperature for about ten minutes to remove residual acid, then immersed in a 40% aqueous solution of potassium hydroxide for one hour at room temperature. Electroconductivity measurements made across the thickness of the impregnated sheet showed it to have an electroconductivity about 30% greater than that of a sheet of the same paper which had been impregnated with the potassium hydroxide solution without prior treatment with polyelectrolyte. The treated sheet retained its flexibility even after impregnation with the potassium hydroxide and was useful as a battery separator.

Similar results were obtained when there were used other polyelectrolyte polymers made by reacting equal parts by weight of sodium polystyrene sulfonate and of polyvinyl benzyl trimethyl ammonium chloride and by reacting one part of the former with two of the latter by weight.

Although specific embodiments of the invention have been herein described, it is not intended to limit the invention solely thereto but to include all of the obvious variations and modifications within the spirit and scope of the appended claims.

What is claimed is:

1. A plasticized gel composition formed of two synthetic organic linear polymers ionically cross-linked to each other, one of said polymers containing dissociable anionic groups and the other containing dissociable cationic groups the proportions of said two linear polymers being from 10:1 to 1:10 by weight, and distributed in said gel composition a plasticizer therefor selected from the class consisting of non-volatile water-miscible acids having an ionization constant greater than $10^{-2}$, water-miscible organic oxysulfur compounds, water-miscible organic oxyphosphorus compounds, and mixtures thereof.

2. A solid gel composition as claimed in claim 1 in which said anionic groups are sulfonate, said cationic groups are quaternary ammonium groups, and said plasticizer is sulfuric acid.

3. A solid gel composition as claimed in claim 1 in which said anionic groups are sulfonate, said cationic groups are quaternary ammonium groups, and said plasticizer is phosphoric acid.

4. A solid gel composition as claimed in claim 1 in which said anionic groups are sulfonate, said cationic groups are quaternary ammonium groups, and said plasticizer is dimethyl sulfoxide.

5. A solid gel composition as claimed in claim 1 in which said anionic groups are sulfonate, said cationic groups are quaternary ammonium groups, and said plasticizer is hexamethyl phosphoramide.

6. A solid gel composition as claimed in claim 1 in which one of said polymers is sodium polystyrene sulfonate and the other of said polymers is polyvinyl benzyl trimethyl ammonium chloride.

7. The method of making a plasticized solid gel composition as claimed in claim 1 comprising dissolving said gel structure in an aqueous medium containing at least 10% by weight of a highly dissociated volatile electrolyte, dissolving said plasticizer in the same aqueous medium, gelling said solution by volatilizing a portion of said electrolyte, and subsequently volatilizing at least a major part of the remaining electrolyte and water.

8. The method of making a plasticized solid gel composition as claimed in claim 2 comprising dissolving said gel structure in an aqueous medium containing at least 10% by weight of a highly dissociated volatile electrolyte, dissolving said plasticizer in the same aqueous medium, gelling said solution by volatilizing a portion of said electrolyte, and subsequently volatilizing at least a major part of the remaining electrolyte and water.

9. The method of making a plasticized solid gel composition as claimed in claim 3 comprising dissolving said gel structure in an aqueous medium containing at least 10% by weight of a highly dissociated volatile electrolyte, dissolving said plasticizer in the same aqueous medium, gelling said solution by volatilizing a portion of said electrolyte, and subsequently volatilizing at least a major part of the remaining electrolyte and water.

10. The method of making a plasticized solid gel composition as claimed in claim 4 comprising dissolving said gel structure in an aqueous medium containing at least 10% by weight of a highly dissociated volatile electrolyte, dissolving said plasticizer in the same aqueous medium, gelling said solution by volatilizing a portion of said electrolyte, and subsequently volatilizing at least a major part of the remaining electrolyte and water.

11. The method of making a plasticized solid gel composition as claimed in claim 5 comprising dissolving said gel structure in an aqueous medium containing at least 10% by weight of a highly dissociated volatile electrolyte, dissolving said plasticizer in the same aqueous medium, gelling said solution by volatilizing a portion of said electrolyte, and subsequently volatilizing at least a major part of the remaining electrolyte and water.

12. The method of making a plasticized solid gel composition as claimed in claim 6 comprising dissolving said gel structure in an aqueous medium containing at least 10% by weight of a highly dissociated volatile electrolyte, dissolving said plasticizer in the same aqueous medium, gelling said solution by volatilizing a portion of said electrolyte, and subsequently volatilizing at least a major part of the remaining electrolyte and water.

References Cited

UNITED STATES PATENTS

| | | | |
|---|---|---|---|
| 2,642,406 | 6/1953 | Dickey et al. | 260—30.6 |
| 2,832,746 | 4/1958 | Jackson | 260—874 |
| 2,961,417 | 11/1960 | Small | 260—874 |
| 3,142,652 | 7/1964 | Pace | 260—30.8 |
| 3,154,609 | 10/1964 | Cipriani | 260—30.8 |
| 3,154,612 | 10/1964 | Parczewski | 260—30.6 |

MORRIS LIEBMAN, *Primary Examiner.*

B. A. AMERNICK, *Assistant Examiner.*